United States Patent
Milvert et al.

(10) Patent No.: US 6,601,015 B1
(45) Date of Patent: Jul. 29, 2003

(54) EMBEDDED DATALOGGER FOR AN ENGINE CONTROL SYSTEM

(75) Inventors: Thomas J. Milvert, Columbus, IN (US); Danny R. Baker, Columbus, IN (US); John V. Shutty, Columbus, IN (US); Todd E. Greenwood, Columbus, IN (US); Rick Stoughton, Seymour, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/238,854

(22) Filed: Jan. 28, 1999

Related U.S. Application Data (60) Provisional application No. 60/076,552, filed on Mar. 2, 1998.

(51) Int. Cl.[7] .............................................. B06K 31/04

(52) U.S. Cl. ........................ 702/182; 702/183; 702/187

(58) Field of Search ................................. 702/182, 183, 702/187; 701/35, 29, 115; 73/35.06, 120

(56) References Cited

U.S. PATENT DOCUMENTS

| | | | | |
|---|---|---|---|---|
| 4,271,402 A | | 6/1981 | Kastura et al. | |
| 4,348,729 A | | 9/1982 | Sasayama et al. | |
| 4,404,639 A | * | 9/1983 | McGuire et al. | ............ 364/551 |
| 4,694,408 A | * | 9/1987 | Zaleski | ........................ 364/551 |
| 4,748,843 A | * | 6/1988 | Schafer et al. | ............. 73/117.1 |
| 4,757,454 A | * | 7/1988 | Hisatake et al. | ............. 364/424 |
| 4,817,418 A | * | 4/1989 | Asami et al. | ............... 73/118.1 |
| 4,837,552 A | * | 6/1989 | Vandemotter et al. | ...... 340/461 |
| 4,853,850 A | * | 8/1989 | Krass, Jr. et al. | ........... 364/200 |
| 5,003,477 A | | 3/1991 | Abe et al. | |
| 5,005,129 A | | 4/1991 | Abe et al. | |
| 5,034,894 A | | 7/1991 | Abe | |
| 5,050,080 A | | 9/1991 | Abe | |
| 5,268,842 A | * | 12/1993 | Marston et al. | ........ 364/431.05 |
| 5,276,619 A | | 1/1994 | Ohara et al. | |
| 5,293,317 A | | 3/1994 | Adrain et al. | |
| 5,313,388 A | * | 5/1994 | Cortis | .................... 364/424.04 |
| 5,446,665 A | | 8/1995 | Adrian et al. | |
| 5,461,569 A | | 10/1995 | Hara et al. | |
| 5,491,631 A | * | 2/1996 | Shirane et al. | ......... 364/424.04 |
| 5,506,773 A | * | 4/1996 | Takaba et al. | ......... 364/424.03 |
| 5,553,589 A | | 9/1996 | Middleton et al. | |
| 5,581,464 A | * | 12/1996 | Woll et al. | .............. 364/424.04 |
| 5,602,733 A | * | 2/1997 | Rogers et al. | ......... 364/424.03 |
| 5,638,273 A | * | 6/1997 | Coiner et al. | .......... 364/424.04 |
| 5,745,864 A | * | 4/1998 | Hosoe et al. | .................. 701/35 |
| 5,757,645 A | * | 5/1998 | Schneider et al. | .... 364/424.034 |
| 5,893,893 A | * | 4/1999 | Holt et al. | ..................... 701/35 |
| 5,896,083 A | * | 4/1999 | Weisman, II et al. | ....... 340/438 |
| 5,926,775 A | * | 7/1999 | Brumley et al. | ............ 702/127 |
| 5,948,026 A | * | 9/1999 | Beemer et al. | ............. 701/115 |
| 5,954,617 A | * | 9/1999 | Horgan et al. | .............. 477/107 |

(List continued on next page.)

*Primary Examiner*—Marc S. Hoff
*Assistant Examiner*—Carol S Tsai
(74) *Attorney, Agent, or Firm*—Woodard, Emhardt, Moriarty, McNett & Henry LLP (57) ABSTRACT

An apparatus is disclosed including an internal combustion engine, a number of sensors configured to detect operating parameters of the engine, and art engine control system responsive to the sensors to regulate engine operation. The control system includes a controller operatively coupled to a nonvolatile memory and has an interface capable of receiving operator input to customize aspects of a diagnostic data collection routine embedded in the control system. The routine responds to this input to selectively establish a data collection trigger, the nature of the information to be stored in the nonvolatile memory in response to this trigger, and the rate of storage of this information in the memory. The trigger may be externally generated with an operator-controlled triggering device coupled to the control system or internally generated as a function of one or more of the operating parameters.

30 Claims, 5 Drawing Sheets

U.S. PATENT DOCUMENTS

| | | | |
|---|---|---|---|
| 5,964,813 A | * 10/1999 | Ishii et al. | 701/35 |
| 6,009,370 A | * 12/1999 | Minowa et al. | 701/102 |
| 6,076,026 A | 6/2000 | Jambhekar et al. | 701/35 |
| 6,078,859 A | * 6/2000 | Jastrzebski et al. | 701/93 |
| 6,089,207 A | * 7/2000 | Goode et al. | 123/357 |
| 6,092,504 A | * 7/2000 | Barnes et al. | 123/357 |
| 6,131,062 A | * 10/2000 | Nielsen | 701/50 |
| 6,167,338 A | * 12/2000 | De Wille et al. | 701/51 |
| 6,330,873 B1 | * 12/2001 | Letang et al. | 123/322 |

* cited by examiner

EMBEDDED DATALOGGER FOR AN ENGINE CONTROL SYSTEM

This application claims the benefit of provisional application Ser. No. 60/076,552 filed Mar. 2, 1998.

BACKGROUND OF THE INVENTION

The present invention relates to engine control and diagnostic systems, and more particularly, but not exclusively, relates to the collection of diagnostic data with a datalogger embedded in an engine control system.

In recent years, internal combustion engine performance has been improved through the application of sophisticated control systems. Typically, these systems utilize a number of sensors coupled to a programmable digital processor. Unfortunately, the complexity of these control systems frequently makes it difficult to properly diagnose malfunctions so that appropriate corrective action may be taken. Intermittent malfunctions that cannot be readily duplicated during servicing are often particularly difficult to analyze.

Thus, there is a demand for more effective engine control system diagnostic techniques. Preferably, these techniques better facilitate the analysis of intermittent problems. The present invention meets these demands and provides other significant benefits and advantages.

SUMMARY OF THE INVENTION

The present invention relates to engine control and diagnostic systems. Various aspects of the present invention are novel, nonobvious, and provide various advantages. While the actual nature of the invention covered herein can only be determined with reference to the claims appended hereto, certain features which are characteristic of the preferred embodiments disclosed herein are described briefly as follows.

One feature of the present invention is a technique to store diagnostic data for an internal combustion engine with a datalogger embedded in the engine control system. Preferably, various characteristics of the datalogger may be customized by operator input to the control system including, but not limited to, the type of data stored, the rate of data storage, and the condition which triggers data storage.

Another feature of the present invention includes an internal combustion engine with a number of reciprocating. pistons rotatably coupled to a crankshaft and a number of sensors to detect corresponding operating parameters of the engine. A control signal responsive to the sensors regulates engine operation. This control system includes a controller operatively connected to a nonvolatile memory and has an interface to receive operator data to customize a diagnostic data collection routine executed by the controller. This routine responds to the operator data to selectively establish a data collection trigger and designate at least one of the operating parameters to be represented by diagnostic data stored in the memory in response to the data collection trigger. The diagnostic data includes a first segment corresponding to a first time interval of engine operation before the data collection trigger and a second segment corresponding to a second time interval of engine operation after the data collection trigger.

In still another feature of the present invention, an internal combustion engine is provided with a number of reciprocating pistons to provide motive power for a ground transport. The engine has a control system with a memory, and is regulated by periodically monitoring a number of different engine performance parameters with the control system. A first trigger is established and a first number of values representative of at least a portion of the performance parameters are stored in memory at a first predetermined rate in response to the first trigger. A second trigger is established, and a second number of values representative of at least a portion of the performance parameters are stored in the memory at a second predetermined rate in response to the second trigger. The second rate is selected to be different from the first rate by a predetermined amount.

A further feature includes: providing a vehicle with an internal combustion engine and a control system having a controller operatively coupled to a memory, regulating the engine by periodically monitoring a number of engine performance parameters with the control system, and triggering storage of data in the memory to diagnose engine performance by vehicle operator activation of a triggering device operatively coupled to the control system. The data is representative of a predetermined time interval of engine operation and includes at least one of the performance parameters monitored during the predetermined time interval.

In an additional feature, an internal combustion engine has a number of reciprocating pistons rotatably coupled to a crankshaft, and a number of sensors to detect a corresponding number of operating parameters of the engine. Furthermore, a control system is included which responds to the sensors to regulate operation of the engine. The control system has a controller operatively coupled to a nonvolatile digital memory and a means for diagnosing abnormal operation of the engine. This diagnosing means prompts storage of data representative of at least a portion of the operating parameters in the memory in response to a trigger event. The data includes a first data segment corresponding to a first predetermined time interval before the event and a second data segment corresponding to a second predetermined time interval after the event. The event is established by operator input to the control system.

Accordingly, it is one object of the present invention to provide a technique to diagnose internal combustion engine performance.

It is another object to provide an engine control system with an embedded diagnostic data collection routine which may be configured by operator input.

It is still another object to provide for diagnostic data collection in the memory of a engine control system in response to a vehicle operator activated triggering device.

An additional object is to provide for the storage of diagnostic data in the memory of an engine control system at variable data storage rates.

Further objects, features, aspects, benefits, and advantages of the present invention shall become apparent from the detailed drawings and descriptions provided herein.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described technique, apparatus, process, method, or device, and any further applications of the principles of the invention as described herein are contemplated as would normally occur to one skilled in the art to which the invention relates.

Figure 1:
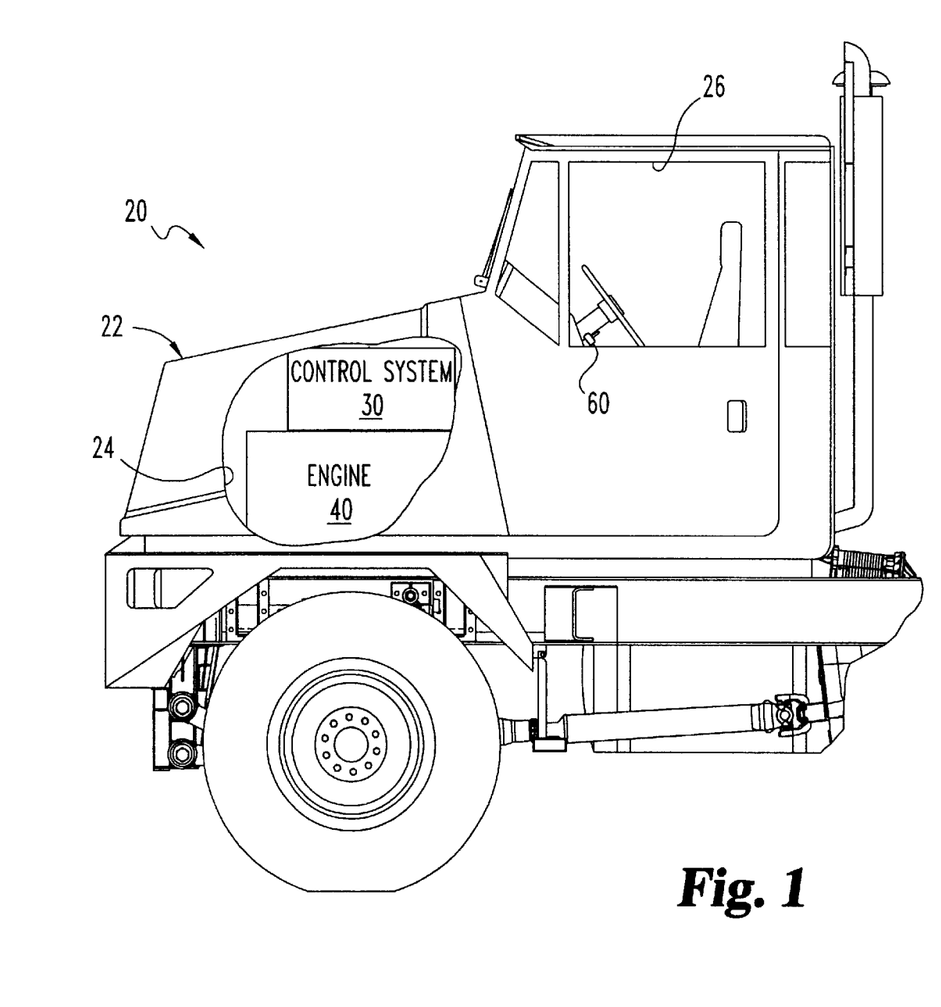
FIG. 1 is a partial cutaway view of a vehicular system of one embodiment of the present invention.

FIG. 1 is a vehicular system 20 of one embodiment of the present invention. System 20 includes a ground transport vehicle 22 with engine compartment 24 and vehicle operator compartment 26. A cutaway of engine compartment 20 reveals a schematically depicted control system 30 and internal combustion engine 40. Control system 30 monitors and regulates operation of engine 40. Engine 40 is the primary source of motive power for vehicle 22. In vehicle operator compartment 26, an operator-controlled triggering device 60 is also illustrated, as will be more fully described hereinafter.

Figure 2:
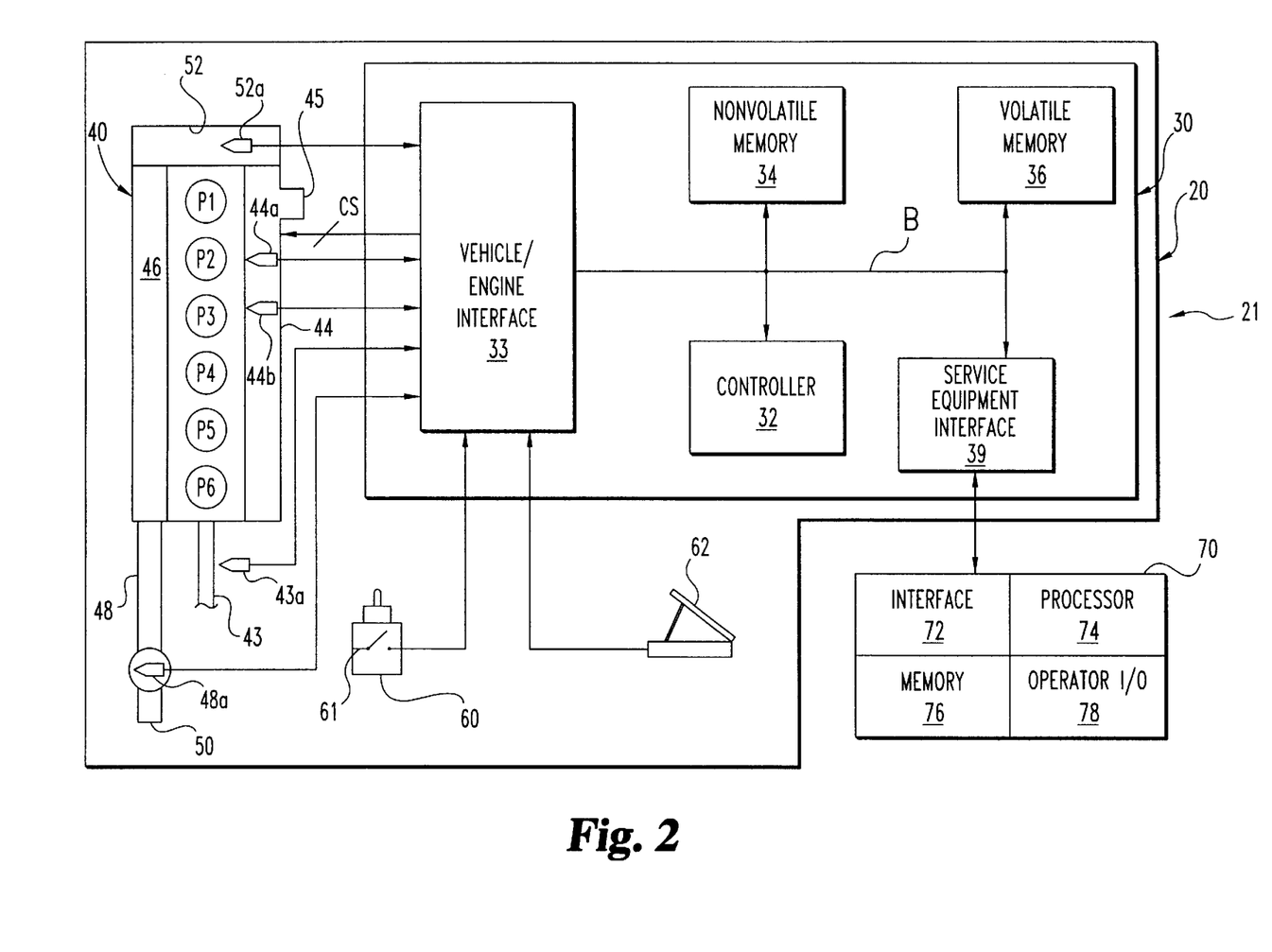
FIG. 2 is a schematic view of the system of FIG. 1 in a servicing configuration.

FIG. 2 further depicts system 20 in a servicing configuration 21 with service equipment 70. In FIG. 2, control system 30 is depicted with a number of schematic operators connected by communication bus B, including controller 32, vehicle/engine interface 33, nonvolatile memory 34, volatile memory 36, and service equipment interface 39.

Control system 30 interfaces with vehicle 22 and engine 40 through interface 33. Control system 30 monitors a number of engine parameters through interface 33 with sensors operatively coupled thereto. Engine 40 is of the multistroke variety with crankshaft 43 being driven by a number of rotatably coupled reciprocating pistons P1–P6 each residing in a cylinder/combustion chamber defined by engine block 40; however, more or fewer pistons and corresponding cylinder/combustion chamber pairs may be utilized. Engine 40 may include a turbocharger having one or more stages (not shown).

Alternatively, engine 40 may be of a rotor-driver intermittent combustion variety or such other type of engine with intermittent internal combustion as would occur to those skilled in the art. Engine 40 may operate with one or more types of fuel including, but not limited to, diesel fuel, gasoline, or gaseous fuel. The fuel may be metered by port injection, upstream carburetion, or by other techniques known to those skilled in the art. Combustion may be initiated by Spark Ignition (SI), Compression Ignition (CI), or as would otherwise occur to those skilled in the art. Preferably, engine 40 is of the CI variety configured for port-injection with diesel fueling and 4-stroke operation.

The rotational speed parameter "n" of engine 40 is determined from sensor 43a disposed to detect rotation of crankshaft 43. In one preferred embodiment, sensor 43a has a toothed wheel mounted to crankshaft 43 and a magnetic pick-up, such as a Hall-effect device. The teeth are disposed about crankshaft 43, each corresponding to a known angle of crankshaft rotation. Each tooth is formed from a material that causes a magnetic field perturbation as it moves by the pick-up during crankshaft rotation. In response, the pick-up generates an electric pulse correspondingly to the passage of each tooth. Consequently, as crankshaft 43 rotates, a train of electric pulses is provided by the pick-up, the rate of which is proportional to rotational engine speed, n. U.S. Pat. No. 5,268,842 to Marston et al. is cited as an additional source of information concerning such sensor arrangements. In other embodiments, a different technique for detecting rotational speed may be employed as would occur to one skilled in the art.

Engine 40 also includes intake manifold 44 with inlet 45. Intake manifold 44 has fluid pressure sensor 44a operatively coupled to interface 33 to provide the intake manifold pressure as parameter IMP. Intake manifold 44 also has temperature sensor 44b operatively coupled to interface 33 to provide the temperature of the fluid in manifold 44 as parameter IMT.

Engine 40 also includes exhaust manifold 46 to collect and remove exhaust gasses from engine 40. Exhaust manifold 46 is in fluid communication with exhaust conduit 48. The exhaust exits through outlet 50 of conduit 48. Exhaust gas oxygen sensor 48a is in communication with exhaust gasses contained in manifold 46 and conduit 48 to detect an exhaust gas oxygen level as parameter EGO.

Engine 40 also includes a coolant reservoir 52 which holds coolant that is circulated through engine 40 to remove heat caused by combustion. Coolant temperature sensor 52a is located within reservoir 52 to measure coolant temperature. Sensor 52a is operatively connected to interface 33 to provide coolant temperature as parameter CT.

Interface 33 is also operatively coupled to triggering device 60. Triggering device 60 is preferably a switch which may be activated by an operator to initiate a discrete-valued pulse or to toggle between different discrete-valued states as represented by signal EXTRIG. It is also preferred that this switch be debounced and appropriately conditioned to process EXTRIG as a one bit binary signal within control system 30. In other embodiments, triggering device 60 may be embodied in another apparatus arranged to initiate a trigger by the vehicle operator from compartment 26 as would occur to one skilled in the art.

The position or setting of throttle control 62 is also detected by control system 30 through interface 33 operatively coupled thereto. The throttle setting is input as parameter THL. Preferably, throttle control 62 is a common accelerator pedal or other vehicle operator control suitable to adjust speed of vehicle 22.

Control system 30 is preferably programmed to regulate operation of engine 40 by monitoring a number of input parameters including n, IMP, IMT, EGO, CT and THL. In response to these input parameters, control system 30 generates a number of output control signals CS. Typically, control signals CS include fueling and timing signals to regulate engine combustion in a conventional manner. Besides parameters n, IMP, IMT, CT, EGO, and THL, control signals CS may be responsive to angular position of crankshaft 43 and an engine camshaft (not shown). These angular positions may be specified as parameters CRANKANG and CAMANG, respectively, and determined in accordance with the teachings of U.S. Pat. No. 5,268,842 to Marston et al. or utilizing such other techniques as are known to those skilled in the art.

Preferably, control system 30 provides electronic throttling and governing of engine 40 in response to parameter THL. U.S. Pat. No. 5,553,589 to Middleton et al. is cited as a source of additional information concerning various electronic governing arrangements. For an embodiment employing this type of governor, a final fueling command parameter FC may be determined as a function of parameter THL and various other parameters and internally specified relationships.

Controller 32 may be comprised of one or more electronic components, including analog circuitry, digital circuitry, or both. Controller 32 is preferably programmable, executing instructions loaded in the corresponding memory; however, the operations of controller 32 or processor 74 may alternatively be embodied in dedicated hardware, such as an integrated state machine, or a combination of programming and dedicated hardware. Preferably, controller 32 is based on a digitally programmable microprocessor or microcontroller integrated circuit device.

It is preferred that nonvolatile memory 34 be provided by an electrically erasable Randon Access Memory (RAM), such as a flash memory; however, a battery back-up RAM an electromagnetic memory, or other type of nonvolatile memory may alternatively be utilized as would occur to one skilled in the art. Preferably, volatile memory 36 is of the static RAM (SRAM) variety suitable for interfacing with controller 32; however other types of volatile RAM may be utilized.

In one embodiment, controller 32, interface 33, memory 34, memory 36, and interface 39 are provided as an Engine Control Module (ECM) assembly (not shown). Further, two or more of controller 32, memory 34, memory 36, interface 39, or interface 33 may be integrated into a common semiconductor component using techniques known to those skilled in the art. In still other embodiments, controller 32, interface 33, memory 34, memory 36, and interface 39 are otherwise arranged as would occur to those skilled in the art.

Interfaces 33, 39 may be provided by one or more conventional electronic components of the digital or analog variety as appropriate for relevant signals. Preferably, interfaces 33, 39 provide appropriate conditioning and formatting preferred for the given input or output signal type, including analog-to-diaital and digital-to-analog conversion as required. It is also preferred that communication bus B be of the digital serial or parallel variety suitable to transfer digital data between the operators of control system 30 connected thereby.

Service equipment interface 39 of control system is shown operatively coupled to service equipment 70. Service equipment 70 includes an interface 72, processor 74, memory 76, and operator I/O 78. Service equipment 70 is typically only connected to system 20 during service operations as shown in configuration 21 of FIG. 2. The number and type of interconnections between service equipment 70 and interface 39 are determined as appropriate for the format and methods of communication between interfaces 39 and 72. Preferably, processor 74 is based on a digitally programmable microprocessor or microcontroller integrated circuit device suitable for service tool use. It is also preferred that memory 76 be of an electronic (e.g. solid state), magnetic, or optical variety that may be readily interfaced with processor 74. Memory 76 may include an optical disk memory (CD), electromagnetic hard or floppy disk media, or a combination of these. Operator I/O 78 includes one or more devices for providing operator input, such as a keyboard or mouse operatively coupled to processor 74. Operator I/O 78 also includes one or more devices for providing output to an operator, such as a display monitor of the Cathode Ray (CRT) or liquid crystal display (LCD) type, and a printer operatively coupled to processor 74.

Sensors 43a, 44a, 44b, 48a, and 52a may provide a signal in either a digital or analog format compatible with associated equipment. Correspondingly, equipment coupled to each sensor is configured to condition and convert sensor signals to the appropriate format, as required. All sensors may be of a type known to those skilled in the art.

Figure 4:
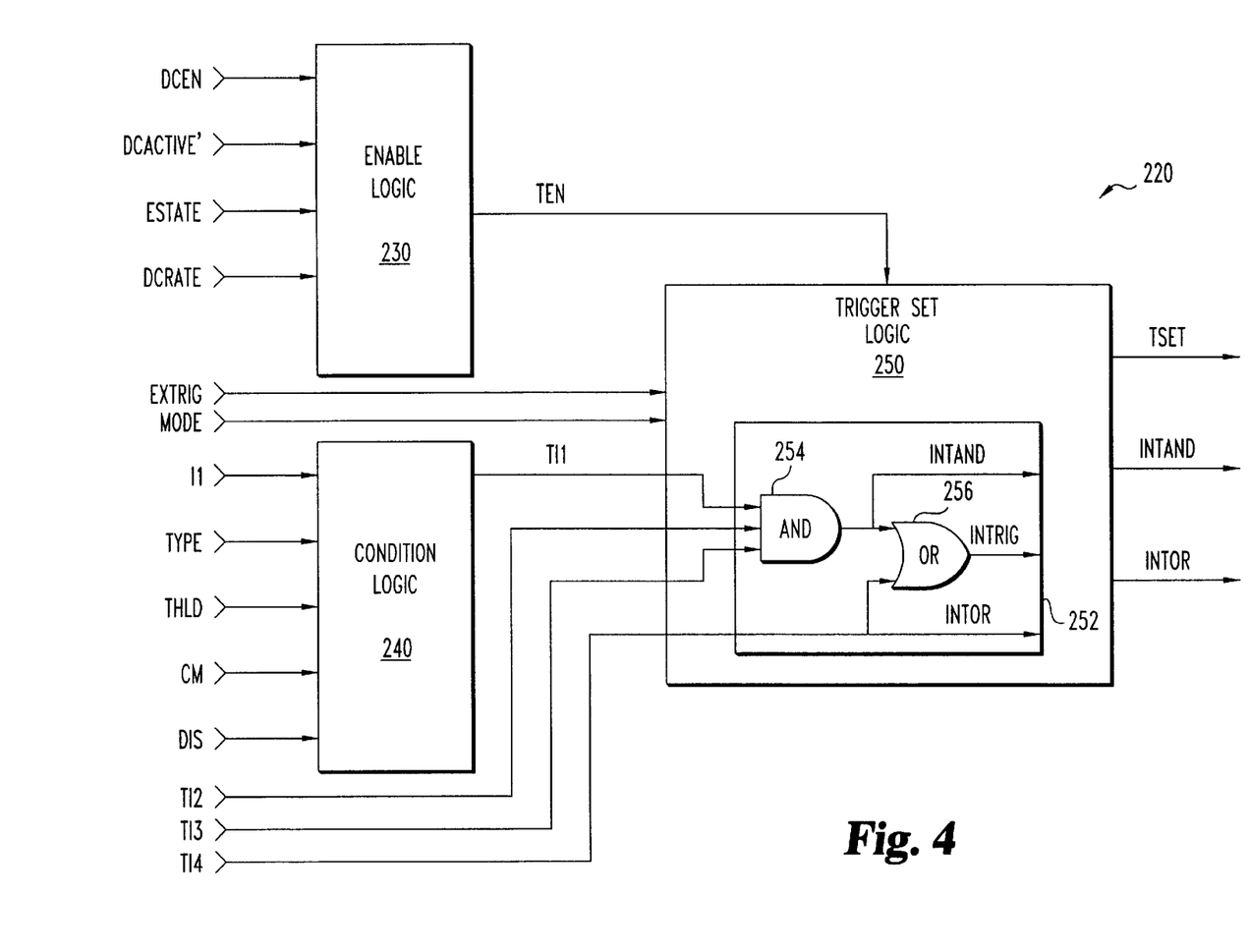
FIG. 4 is a schematic view providing additional details concerning establishment of a trigger for the routine of FIG. 3.

Referring additionally to FIG. 4, trigger logic 220 depicts further details concerning the establishment of a trigger in stage 122. Trigger logic 220 is embodied in controller 32 through programming or other means and is responsive to inputs from interface 33 and 39. Trigger logic 220 includes trigger enable logic 230, conditioning logic 240, and the trigger set logic 250. For example, trigger enable logic 230 responds to a variety of discrete inputs to determine whether to activate the trigger set logic 250 as represented by the one-bit binary trigger enable signal TEN.

Logic 250 is active when TEN=1 and is inactive when TEN=0. A one-bit data collection enable input to logic 230, DCEN, is provided by service equipment 70 to turn off (DCEN=0) or on (DCEN=1) data collection. Another discrete one-bit input which may disable the trigger set logic 250 is the one-bit binary signal DCACTIVE', where the prime (')indicates that DCACTIVE' is active low.

Signal DCACTIVE' is internally set by control system 30 during periods of trigger data collection (DCACTIVE'=0) to effectively ignore additional triggers that occur while data collection in response to an earlier trigger is taking place. The one-bit binary input ESTATE is internally generated as a function of the rotational engine speed parameter n and becomes active (ESTATE=1) only after a minimum rotational engine speed is registered. Signal ESTATE prevents inadvertent triggering before steady-state operation of engine 40 is achieved. Nonetheless, in an alternative embodiment, it may be desirable to trigger selected events during a transient state of engine 40, such as during engine start-up. For this alternative, signal ESTATE may not be utilized or the logic response modified to accommodate transient data capture in the presence of an inactive state of signal ESTATE. Also, for transient data capture, a higher sampling rate relative to steady-state operation may be desirable.

Discrete input DCRATE is a binary signal that is periodically active (DCRATE=1) in correspondence with the storage rate selected in stage 122 with equipment 70. The trigger is enabled (TEN=1) in accordance with DCRATE so that triggers are synchronized to engine parameter storage. Generally, signal TEN enables logic 250 (TEN=1) in accordance with the boolean expression TEN= DCEN*DCACTIVE'*ESTATE*DCRATE.

Besides trigger enable signal TEN, trigger set logic 250 also receives a one-bit binary representation of signal EXTRIG and a one-bit binary signal MODE. Signal MODE is provided to control system 30 by operator input with service equipment 70 to designate a trigger source. When MODE is active (MODE=1), an internal trigger source is indicated. This internal source is based on trigger inputs TI1–TI4 as more fully described in connection with condition logic 240. When MODE is not active (MODE=0), an external trigger source corresponding to EXTRIG from trigger device 60 is indicated. Thus, if MODE=0 and TEN= EXTRIG=1, then TSET is active (TSET=1). However, it should be noted that once TSET becomes active in response to signal EXTRIG, DCACTIVE'=1 and the trigger set logic 250 is disabled until EXTRIG=0 and the triggered data collection event is complete.

When MODE=1, the trigger set logic 250 is responsive to a trigger condition established as a function of discrete trigger inputs TI1–TI4. The trigger inputs TI1–TI4 are each generated in accordance with condition logic 240; however, the condition logic is only depicted for trigger input TI1 to enhance clarity of FIG. 4, it being understood that the remaining trigger input signals TI2, TI3 and TI4, each have a corresponding conditioning logic (not shown).

Referring more specifically to condition logic 240, an input signal I1 is indicated. Signal I1 is a multibit digital value selected with equipment 70 that may correspond to an engine parameter or a fault code. This fault code is provided by control system 30 through diagnostic fault processes of a conventional type. For example, control system 30 may include other routines (not shown) that provide fault codes corresponding to the detection of failed sensors or other devices. U.S. Pat. Nos. 5,034,894 to Abe and 5,005,129 to Abe et al. provide additional information concerning fault code based processes.

The determination of whether I1 is a specified engine parameter or fault code is specified by one bit binary signal TYPE which is registered in control system 30 through operator input with equipment 70. When TYPE is active (TYPE=1), I1 corresponds to a fault data code as specified by an input with equipment 70 referring to a respective location in a fault data table. When TYPE is inactive (TYPE=0), then signal I1 corresponds to an engine parameter specified with equipment 70, such a IMP, IMT, CT, EGO, THL, CRANKANG, CAMANG, FC, or such other parameter as would occur to those skilled in the art.

An operator-defined threshold specified by multibit variable THLD may be input with equipment 70 for comparison to I1 if I1 is designated to be an engine parameter. One-bit binary input signal CM is provided with equipment 70 to specify a comparison mode in conjunction with the inputs TYPE and THLD. If TYPE=CM=0, then TI1=1 when the fault code represented by I1 switches from active to inactive. If TYPE=0 and CM=1, then TI1=1 when the fault code switches from inactive to active. If TYPE=1 and CM=0, then TI1=1 when the engine parameter represented by I1 is less than THLD. If TYPE=CM=1, then TI1=1 when the engine parameter represented by I1 is greater than or equal to THLD.

Discrete input DISABLE is input with equipment 70 to selectively disable TI1. If DISABLE=1, TI1 is disabled (TI1=0) until changed. If DISABLE=0, TI1 is active being determined in accordance with the other inputs to logic 240.

With the same type of conditioning logic established for each of the remaining discrete trigger inputs TI2, TI3 and TI4, as for TI1, trigger set logic 250 determines the internal trigger function through boolean logic function 252. Logic function 252 includes a three-input AND gate 254 which has an output provided to one of two inputs of OR gate 256. The discrete trigger conditions TI1, TI2, and TI3 and each provided to a corresponding input of AND gate 254. The remaining input to OR gate 256 is discrete trigger input TI4. The resulting internal trigger output INTRIG may be described by the boolean expression INTRIG=TI4+(TI1*TI2*TI3). Also, the corresponding inputs to OR gate 256: INTAND=TI1*TI2*TI3 and INTOR=TI4 are output by logic 250. Trigger set logic 250 responds to the mode signal MODE to determine whether the discrete trigger signal TSET corresponds to external trigger signal EXTRIG (MODE=0) or the internal trigger signal INTRIG (MODE=1).

Figure 5:
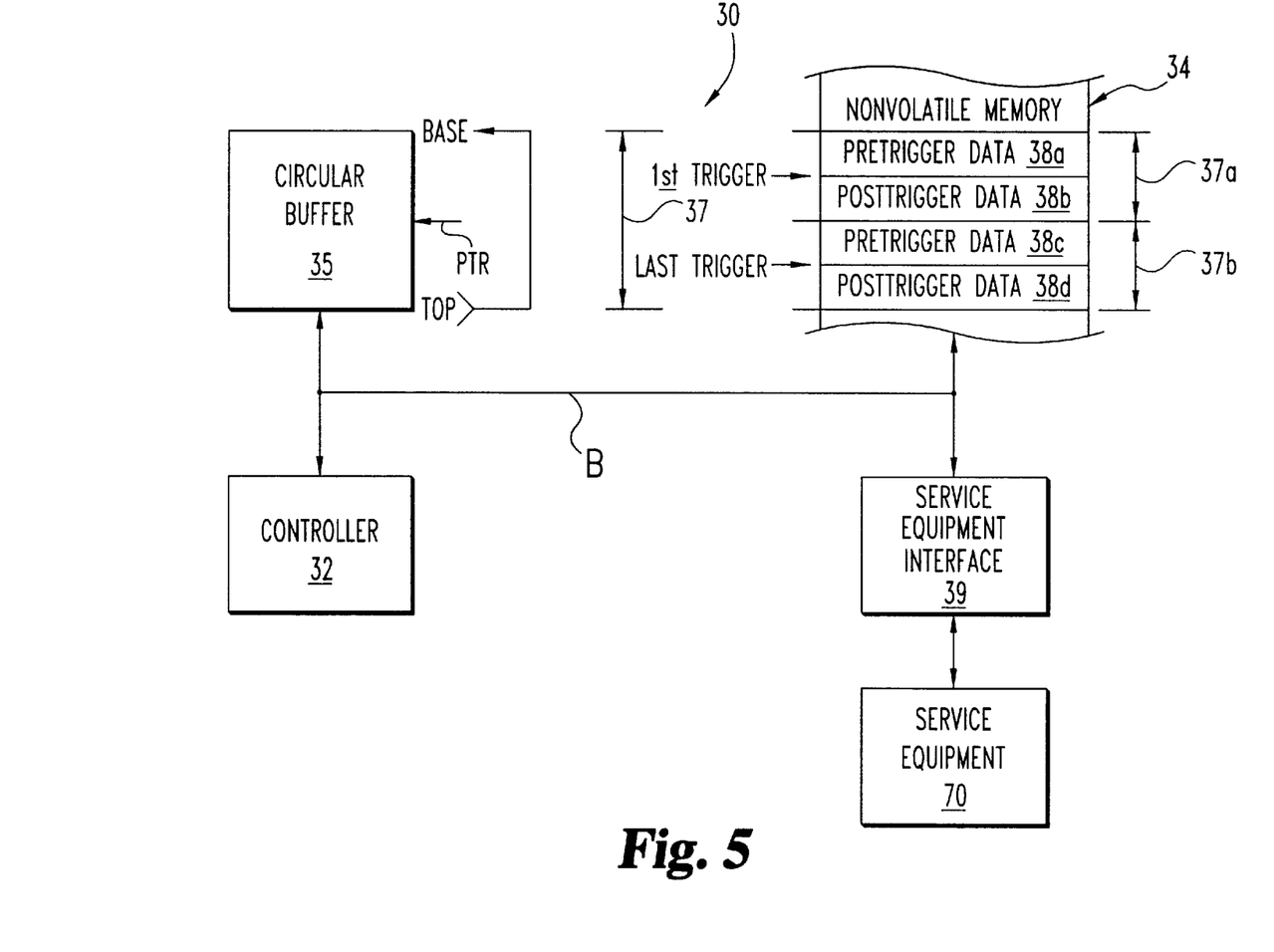
FIG. 5 is a partial schematic view of the control system of FIG. 1 illustrating selected aspects of the routine of FIG. 3.

Returning to FIG. 3, after the data collection characteristics are established in stage 122, control flows to stage 124. In stage 124, the data collection process is initiated. After stage 124, control flows to stage 126. Stage 126 activates operation of circular buffer 35 of control system 30 in response to initiation of the data collection process in stage 124. Referring additionally to FIG. 5, circular buffer 35 is shown coupled on bus B to controller 32 and nonvolatile memory 34 via bus B. Circular buffer 35 may be a separate component of control system 30 or embedded in an existing component. Preferably, circular buffer 35 is a predefined portion of volatile memory 36 which is managed by programming of controller 32.

Once activated in stage 126, circular buffer 35 continuously stores the selected engine parameters in a segment of contiguous memory locations in the relative address range BASE through TOP. Buffer address pointer PTR is incremented to consecutively store the one or more engine parameters specified in stage 122 in corresponding sets of one or more memory locations within buffer 35; where these sets are stored at the rate selected in stage 122. Once pointer PTR reaches the last address, PTR=TOP, it loops back to the first address, PTR=BASE, for the next memory storage operation.

Figure 3:
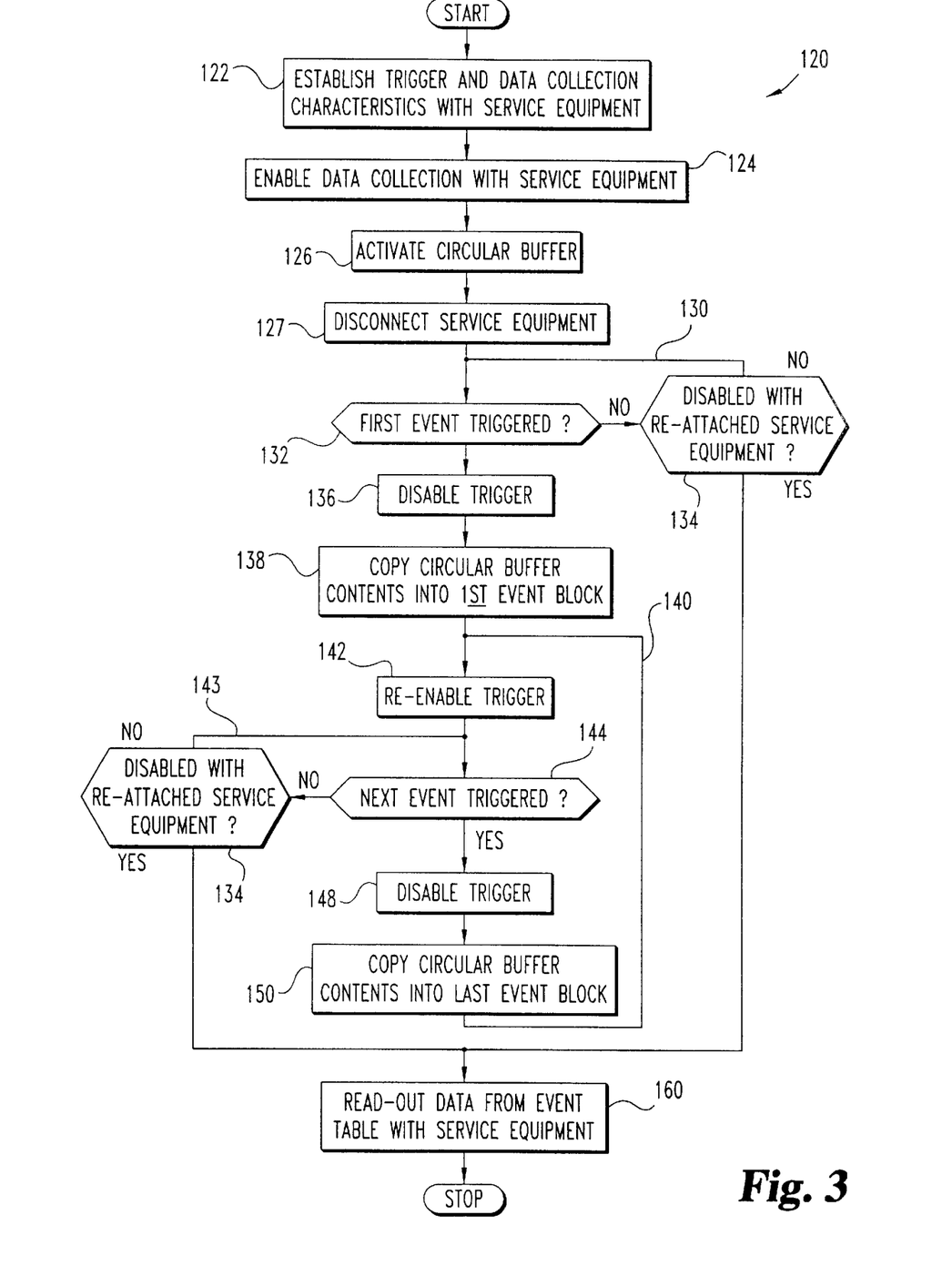
FIG. 3 is a flow chart of a routine performed with the system of FIG. 1 and configuration of FIG. 2.

In stage 127, service equipment 70 is disconnected from system 20. Through this disconnection, vehicle 22 may be road tested free of equipment 70. Also, once detached, equipment 70 may be used to service other vehicles while waiting for an intermittent malfunction to trigger one or more data collection events by control system 30. Alternatively, equipment 70 may remain connected to control system 30, but is not needed to perform the embedded data collection process described in connection with reference numerals 130–150 as follows. Preferably, the data collection process represented by reference numerals 130–150 is performed by executing a programmed datalogger routine with processor 32.

Once buffer 35 is activated in stage 126, routine 120 enters wait loop 130 where conditional 132 is encountered. Conditional 132 tests whether the first event has been triggered by the first activation of signal TSET since enablement of data collection in stage 124. Activation of TSET is in accordance with the inputs to trigger logic 220 described in connection with stage 122. If TSET has not been activated (TSET=0), then control flows to conditional 134 to determine whether diagnostic data collection is still enabled (DCEN=1) or whether equipment 70 has been re-attached and data collection disabled (DCEN=0). If diagnostic data collection is still enabled (DCEN=1), control returns via wait loop 130 to determine once more whether the first event has been triggered in conditional 132. If the diagnostic data collection is no longer enabled (DCEN=0), then control flows to stage 160.

If the first event is triggered-as determined in conditional 132 (TSET=1), the trigger is disabled by setting DCACTIVE' (DCACTIVE'=0) in stage 136. In response to the trigger, data is stored in circular buffer 35 for a predetermined number of locations in stage 138 after the trigger, and then the contents of circular buffer 35 are copied into data collection memory block 37 of nonvolatile memory 34. Block 37 has two equally sized data blocks 37a (1st event block) and 37b (last event block). In stage 138, the contents of buffer 35 are copied into first event block 37a. Preferably, the size of circular buffer 35 in terms of the number of memory locations and bitwidth of each storage location is the same as each event block 37a, 37b.

The first event block 37a has pretrigger data segment 38a that corresponds to data collected in circular buffer 35 before the first event was triggered, and post-trigger segment 38b that corresponds to the predetermined number of data locations stored in circular buffer 35 after the first event was triggered. The position of the first trigger relative to segments 38a, 38b is indicated in FIG. 5. Control system 30 references the location of pointer PTR in circular buffer 35 at the time of the trigger to align the contents of buffer 35 with data segments 38a and 38b.

Once the data contents from circular buffer 35 are copied into the first event block 37a, last event loop 140 is entered and control flows to stage 142. The trigger signal TEN is reactivated (TEN=1) by internally setting DCACTIVE' inactive (DCACTIVE'=1) in stage 142 and engine parameter storage in buffer 35 is reactivated. Upon encountering stage 142, second wait loop 143 is entered. In loop 143, conditional 144 tests whether the next event corresponding to the trigger defined by logic 220 has been set. If not (TSET=0), control flows to conditional 146 to determine whether DCEN is still active. If DCEN is active (DCEN=1), control loops back via wait loop 143 to conditional 144. If DCEN is no longer active (DCEN=0), then control flows to stage 160.

If the next event is triggered by TSET=1, then wait loop 143 is exited and the trigger is internally disabled in stage 148 by setting DCACTIVE' active (DCACTIVE'=0). The location of PTR of buffer 35 corresponding to this next trigger is noted, and a predetermined number of post-trigger parameters are stored in buffer 35 at the selected rate. Next, the contents of circular buffer 35 are copied into last event block 37b in stage 150. Pretrigger data in buffer 35 is stored in pretrigger data segment 38c and post-trigger data in buffer 35 is stored in post-trigger data segment 38d. The position of the last trigger between segments 38c and 38d is also indicated in FIG. 5.

Once the operations of stage 150 are complete, last event block loop 140 returns control to re-enable the trigger in stage 142. Notably, loop 140 is repeated, overwriting the last event block 37b with the most recently triggered event until diagnostic data collection is disabled by changing the state of signal DCEN from DCEN=1 to DCEN=0 with re-attached service equipment 70. Thus, control system 30 retains data for the first event and continues storing data for the last event until disabled.

In one preferred embodiment, the length of circular buffer 35 and blocks 37a, 37b are each 400 bytes, the length of pretrigger data segments 38a, 38c are each 200 bytes and the length of the post-trigger data segments 38b, 38d are each 200 bytes. Furthermore, in one embodiment, the orientation of data segments 38a–38d relative to memory 34 may vary. For this embodiment, a marker corresponding to pointer PTR is preferably stored in a predetermined location of memory 34 for subsequent access by equipment 70. This marker may be accessed by service equipment 70 to determine the beginning of the post-trigger data for each stored event and accordingly sort the data. Furthermore, service equipment 70 may interrogate system 30 to determine other aspects of data collection including the run-time of the first and last events, the type of stored data, and the status of various inputs and outputs of trigger logic 220.

Once disabled (DCEN=0), control flows from conditional 146 to stage 160. Notably, stage 160 may also be reached from conditional 134 by setting DCEN=0 with re-attached equipment 70 in conditional 132 prior to detecting the first trigger. In stage 160, the contents of block 37 are copied into memory 74 of service equipment 70 via interface 39. Preferably, service equipment 70 includes software and hardware to process this data and display it via operator I/O 78 for review and analysis. In response to reviewing data provided with equipment 70, an operator can determine different engine parameters to store in response to a trigger condition, a different storage rate, a different trigger mode (as indicated by signal MODE), or different inputs to an internal trigger to improve the evaluation.

Thus an operator may control selected characteristics of logic 220 through inputs with equipment 70. It should be appreciated, that once these inputs are registered in control system 30, service equipment 70 is no longer required until collected data is to be analyzed. Thus, after the trigger is established and data collection is enabled, service equipment 70 may be disconnected from system 20. Indeed, after disconnection, a vehicle operator may initiate data collection with device 60 in response to a malfunction during routine road operation of vehicle 22 without the need for external service tools.

As used herein, it should be appreciated that: "parameter," "stage," "conditional," "variable," "criterion," "characteristic," "quantity," "amount," "value," "buffer," "constant," "flag," "data," "record," "memory block," "threshold," "input," "output," "command," "parameter," "look-up table," and "memory location" each generally correspond to one or more signals within processing equipment of the present invention.

It should be appreciated that the schematic depictions of FIGS. 1, 2, and 5, the operations of the flow chart of FIG. 3, and the logic of FIG. 4 are provided as a convenient means of illustration, it being understood that the depicted operators and elements may be altered, rearranged, substituted, deleted, duplicated, or combined as would occur to those skilled in the art without departing from the spirit of the present invention.

All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method, comprising:
   providing an internal combustion engine with a number of reciprocating pistons to power a ground transport vehicle, the engine having a control system with a memory;
   regulating the engine by periodically monitoring a number of different engine performance parameters with the control system;
   establishing a first trigger event;
   storing a first number of values representative of at least a portion of the performance parameters in the memory at a first predetermined rate in response to the first event;
   establishing a second trigger event; and
   storing a second number of values representative of at least a portion of the performance parameters in the memory at a second predetermined rate in response to the second event, the second rate being selectably different from the first rate by a predetermined amount.

2. The method of claim 1, wherein the first rate and the second rate are operator selectable.

3. The method of claim 1, further comprising:

reviewing the first values;

changing from the first rate to the second rate in response to said reviewing.

4. The method of claim 3, wherein the second trigger event is defined as a function of a set of the parameters determined in response to said reviewing.

5. The method of claim 1, wherein the first event corresponds to external triggering provided by an operator-controlled trigger device and the second event corresponds to internal triggering defined as a function of at least a portion of the parameters.

6. The method of claim 1, wherein the first values include a first data segment corresponding to engine operation a first predetermined time interval before the first event and a second data segment corresponding to engine operation a second predetermined time interval after the first event.

7. The method of claim 1, wherein the memory is non-volatile.

8. The method of claim 7, wherein:

the control system includes a circular buffer operatively coupled to the memory to store a pretrigger data segment and a post-trigger data segment in response to each of the first and second events;

the parameters are operator-selectable wish service equipment operatively coupled to the control system, and the parameters include at least rotational engine speed, coolant temperature, and a throttle setting;

the first rate and the second rate are operator selectable with the service equipment; and the first event and the second event are each established as a function of at least a portion of the parameters defined with the service equipment or an operator-controlled triggering device operatively coupled to the control system.

9. An apparatus, comprising: a vehicle, said vehicle including:

an internal combustion engine with a number of reciprocating pistons rotatably coupled to a crankshaft;

a number of sensors configured to detect a corresponding number of operating parameters of said engine;

an operator compartment including a triggering device operable by a vehicle operator to activate diagnostic data collection; and an engine control system responsive to said sensors to regulate operation of said engine, said control system including a controller operatively coupled to a nonvolatile memory and having an interface to receive operator data from service equipment to customize a diagnostic data collection routine executed by said controller, said routine being selectively responsive to said operator data to recognize activation of said triggering device to store diagnostic data in said memory representative of at least one of said operating parameters, said diagnostic data including a first segment corresponding to a first time interval of engine operation before said activation and a second segment corresponding to a second time interval of engine operation after said activation.

10. The apparatus of claim 9, wherein said routine is further responsive to said operator data to select a rate of storage of said diagnostic data in said memory.

11. The apparatus of claim 9, wherein said routine is responsive to said operator data to establish an internal trigger condition as a function of said operating parameters, said routine recognizing triggering by said internal trigger condition or said triggering device in accordance with said operator data.

12. The apparatus of claim 9, wherein said sensors include:

a first sensor providing a first signal corresponding to rotational speed of said crankshaft;

a second sensor corresponding to setting of a throttle operatively coupled to said control system; and a third sensor corresponding to coolant temperature of a coolant circulating in said engine.

13. The apparatus of claim 9, further comprising:

service equipment operatively coupled to said control system to provide said operator data through said interface;

a circular buffer operatively coupled to said controller and said memory; and wherein said routine is further responsive to said operator data to define a rate of storage of said diagnostic data and designate at least two of said operating parameters to be represented by said diagnostic data.

14. A method, comprising:

coupling service equipment to a ground transport vehicle, the vehicle including an internal combustion engine with a control system having a memory;

establishing a trigger condition for diagnostic data collection by the control system, the trigger condition being established with the service equipment coupled to the vehicle;

decoupling the service equipment from the vehicle;

detecting the trigger condition with the control system while operating the vehicle without the service equipment coupled thereto, the control system storing engine parameter data in the memory in response to the trigger condition, the data including a pretrigger data segment and a post-trigger data segment; and recoupling the service equipment to the vehicle after said triggering to analyze the data stored in the memory.

15. The method of claim 14, wherein the trigger condition is provided by activation of a triggering device located in an operator compartment of the vehicle.

16. The method of claim 14, further comprising selecting a rate of storage of the data in the memory with the service equipment when coupled to the vehicle.

17. The method of claim 14, wherein the data is stored in a first portion of the memory in response to the first occurrence of the trigger condition and in a second portion of the memory in response to each subsequent occurrence of the trigger condition until storage is deactivated with said service equipment after said recoupling, such that data stored in response to occurrences after the second occurrence overwrite the data recorded in response to the previous occurrence.

18. The method of claim 14, wherein the memory is nonvolatile and the engine parameter data is maintained in a circular buffer by the control system before storage in the memory.

19. The method of claim 14, further comprising:

changing a characteristic of storage of the engine parameter data with the service equipment after said recoupling;

disconnecting the service equipment after said changing;

operating the vehicle after said disconnecting;

collecting additional data in the memory;

reconnecting the service equipment to examine the additional data.

20. The method of claim 19, wherein said changing includes changing the trigger condition from activation of an operator-controlled triggering device to an internal trigger condition established as a function of a number of vehicle operating parameters.

21. The method of claim 19, wherein said changing includes changing a rate of storage of the data in the memory.

22. The method of claim 19, wherein said changing includes changing the type of engine parameter data stored in the memory in response to the trigger condition.

23. A method, comprising:

providing a vehicle with an internal combustion engine and a control system having a controller operatively coupled to a memory;

regulating the engine by periodically monitoring a number of engine performance parameters with the control system; and triggering storage of data in the memory to diagnose engine performance by vehicle operator activation of a triggering device operatively coupled to the control system, the data being representative of a predetermined time interval of engine operation and including at least one of the performance parameters monitored during the predetermined time interval;

wherein the predetermined time interval includes a first segment corresponding to the engine operation before said triggering and a second segment corresponding to the engine operation after said triggering.

24. A method, comprising:

providing a vehicle with an internal combustion engine and a control system having a controller operatively coupled to a memory;

regulating the engine by periodically monitoring a number of engine performance parameters with the control system; and triggering storage of data in the memory to diagnose engine performance by vehicle operator activation of a triggering device operatively coupled to the control system, the data being representative of a predetermined time interval of engine operation and including at least one of the performance parameters monitored during the predetermined time interval;

wherein storage of the data is at a rate selected from a range of about 0.125 hertz to about 4 hertz.

25. An apparatus, comprising:

an internal combustion engine with a number of reciprocating pistons rotatably coupled to a crankshaft;

a number of sensors configured to detect a corresponding number of operating parameters of said engine;

an engine control system responsive to said sensors to regulate operation of said engine, said control system including a controller operatively coupled to a non-volatile memory and a means for diagnosing abnormal operation of said engine, said diagnosing means for prompting storage of diagnostic data representative of at least a portion of said operating parameters in said memory in response to a trigger event, said diagnostic data including a first data segment corresponding to a first predetermined time interval before said event and a second data segment corresponding to a second predetermined time interval after said event; and wherein said event is established by operator input to said control system.

26. The apparatus of claim 25, further comprising a vehicle powered by said engine, said vehicle carrying said engine, said sensors, and said control system.

27. The apparatus of claim 25, further comprising service equipment operatively coupled to said control system, said trigger being defined by an operator with said service equipment as a predetermined function of at least a portion of said parameters.

28. The apparatus of claim 25, wherein said diagnosing means includes a means for operator selection of at least a portion of said performance parameters.

29. The apparatus of claim 25, herein said diagnosing means includes:

service equipment operatively coupled to said control system to provide said operator data through said interface;

an operator controlled triggering device operatively coupled to said control system; and a circular buffer operatively coupled to said controller and said memory, said circular buffer, said controller, and said memory being configured to capture at least a portion of said operating parameters in said circular buffer during normal operation of said engine, and transferring said diagnostic data from said circular buffer to said memory in response to said event.

30. The method of claim 1, wherein the first trigger event and the second trigger event are prevented from causing said storing until an enablement signal is provided in response to a function of at least one of the engine performance parameters.

* * * * *